(12) United States Patent
Yamashita et al.

(10) Patent No.: US 6,638,054 B2
(45) Date of Patent: Oct. 28, 2003

(54) INJECTION MOLDING MACHINE FOR MAKING A WORM WHEEL

(75) Inventors: Kikuo Yamashita, Hannan (JP); Tetsuya Minamiguchi, Osaka (JP); Takanori Kurokawa, Yamatokooriyma (JP); Michitoshi Mitsumaru, Sakurai (JP)

(73) Assignees: Koyo Seiko Co., Ltd., Osaka (JP); Fukui Seiki Kogyo Co., Ltd., Osaka (JP)

( * ) Notice: Subject to any disclaimer, the term of this patent is extended or adjusted under 35 U.S.C. 154(b) by 2 days.

(21) Appl. No.: 10/025,785

(22) Filed: Dec. 26, 2001

(65) Prior Publication Data

US 2002/0078776 A1 Jun. 27, 2002

(30) Foreign Application Priority Data

Dec. 27, 2000 (JP) .......................... 2000-398469
Nov. 14, 2001 (JP) .......................... 2001-349162

(51) Int. Cl.[7] .............................................. B29C 45/44
(52) U.S. Cl. ........................................ 425/556; 425/577
(58) Field of Search ................................. 425/444, 556, 425/577, DIG. 58

(56) References Cited

U.S. PATENT DOCUMENTS

| 3,718,420 A | * | 2/1973 | Florjancic ............ 425/DIG. 58 |
| 3,843,088 A | * | 10/1974 | McLoughlin et al. ....... 425/577 |
| 4,576,568 A | * | 3/1986 | Grannen, III ............... 425/577 |
| 4,889,480 A | * | 12/1989 | Nakamura et al. .......... 425/577 |
| 5,084,223 A | * | 1/1992 | Morita et al. ............... 425/444 |
| 5,824,256 A | * | 10/1998 | Ballester ..................... 425/577 |
| 6,099,785 A | * | 8/2000 | Schweigert et al. . 425/DIG. 58 |

* cited by examiner

*Primary Examiner*—Tim Heitbrink
(74) *Attorney, Agent, or Firm*—Rabin & Berdo, PC (57) ABSTRACT

The invention relates to a worm wheel for use in a reduction gear, for example, and to a machine and a method for forming the same. The worm wheel includes a tooth having a tooth crest. At least the teeth are formed by injection molding a synthetic resin. The tooth crest includes a trace formed along a parting line as a result of the injection molding process. The trace does not exist on a surface of action of the tooth. The invention is suitable for applications demanding high contact gear accuracies.

6 Claims, 9 Drawing Sheets

INJECTION MOLDING MACHINE FOR MAKING A WORM WHEEL

CROSS REFERENCE TO RELATED APPLICATION

This application claims the benefit under 35 U.S.C. §119 of Japanese Patent Application Nos.2000-398469 and 2001-349162, the abstracts of disclosure of which are incorporated herein by reference.

BACKGROUND OF THE INVENTION

1. Field of the Invention

The present invention relates to a worm wheel for use in reduction gears and the like as well as to a machine and a method for forming the same.

2. Description of Related Arts

In general, it is very difficult to form a worm wheel from a synthetic resin because the worm wheel, which is assembled with a worm shaft in a worm gear mechanism, has a lead angle at its teeth and is formed with recessed surfaces at bottom lands.

Hence, it is a general practice to use a hobbing or milling machine for shaping the worm wheel.

The fabrication of the worm wheel using a machine tool is costly because it involves a very difficult operation for transforming a gear shape into a shape to be hobbed. In addition, the hobbed piece requires deburring.

If the worm wheel is formed from the synthetic resin, there may be another problem that the presence of a parting line on a surface of action of the tooth will affect contact gear accuracies.

It is an object of the invention to provide a worm wheel formed from the synthetic resin at low costs and featuring high contact gear accuracies as well as to provide a method and machine for forming the same.

SUMMARY OF THE INVENTION

In one preferred aspect of the invention for achieving the above object, there is provided a worm wheel comprising a tooth having a tooth crest, and a bottom land formed at a bottom of a tooth space between adjoining teeth, the bottom land including a recessed surface, wherein at least the teeth are formed by injection molding a synthetic resin, and wherein the tooth crest includes a trace formed along a parting line as a result of the injection molding process.

The invention achieves high contact gear accuracies because the trace of the parting line does not exist on the surface of action of the tooth. The invention accomplishes a lower material cost than the method of forming the worm wheel by cutting and also negates the need for deburring which is necessary in the cutting process. This leads to the reduction of the manufacturing costs. The invention further offers an advantage of increasing the wear resistance of the worm wheel by virtue of a close-grained skin layer formed on the surface of the formed teeth.

In another preferred aspect of the invention, there is provided a forming machine comprising a stationary mold, a movable mold movably provided relative to the stationary mold, a stationary mold plate disposed at the stationary mold, a movable mold plate disposed at the movable mold, recesses formed in opposite surfaces of the stationary mold plate and the movable mold plate, a core disposed in the recess of the movable mold plate, a plurality of slide cores allowed to move radially of the core as arranged radially about the core, diameter decreasing means for simultaneously moving the slide cores radially inwardly relative to the core at closure of the movable mold, and diameter increasing means for simultaneously moving the slide cores radially outwardly relative to the core at opening of the movable mold. Each slide core includes a block shaped like a fan in plan, the block including a tooth crest forming face and a tooth-space forming projection formed centrally of a width of the tooth crest forming face. During the closure of the mold, adjoining slide cores are in intimate contact at a respective lateral side of their blocks while defining the parting line between their tooth crest forming faces.

According to this embodiment, the forming step is carried out with the mold closed in a manner that the plural slide cores intimately contact each other at the lateral sides of their blocks. Hence, the parting line formed in correspondence to a clearance between adjoining slide cores exists on the tooth crest of the tooth of the formed worm wheel but not on the surface of action of the tooth. Therefore, the contact gear accuracies are not decreased. The worm wheel featuring high contact gear accuracies can be formed from the synthetic resin at low manufacturing costs. In addition, the formed article need not be forcibly removed because the diameter defined by the slide cores is increased when the mold is opened.

BRIEF DESCRIPTION OF THE DRAWINGS

FIG. 7A is a perspective view of the slide core whereas

FIG. 9A is a front view of a tooth crest whereas

DETAILED DESCRIPTION OF THE PREFERRED EMBODIMENT

A preferred embodiment of the invention will hereinbelow be described with reference to the accompanying drawings. FIGS. 1 to 4 illustrates a worm wheel forming machine according to one embodiment of the invention whereas FIGS. 5 and 6 shows an opened mold.

Figure 5:
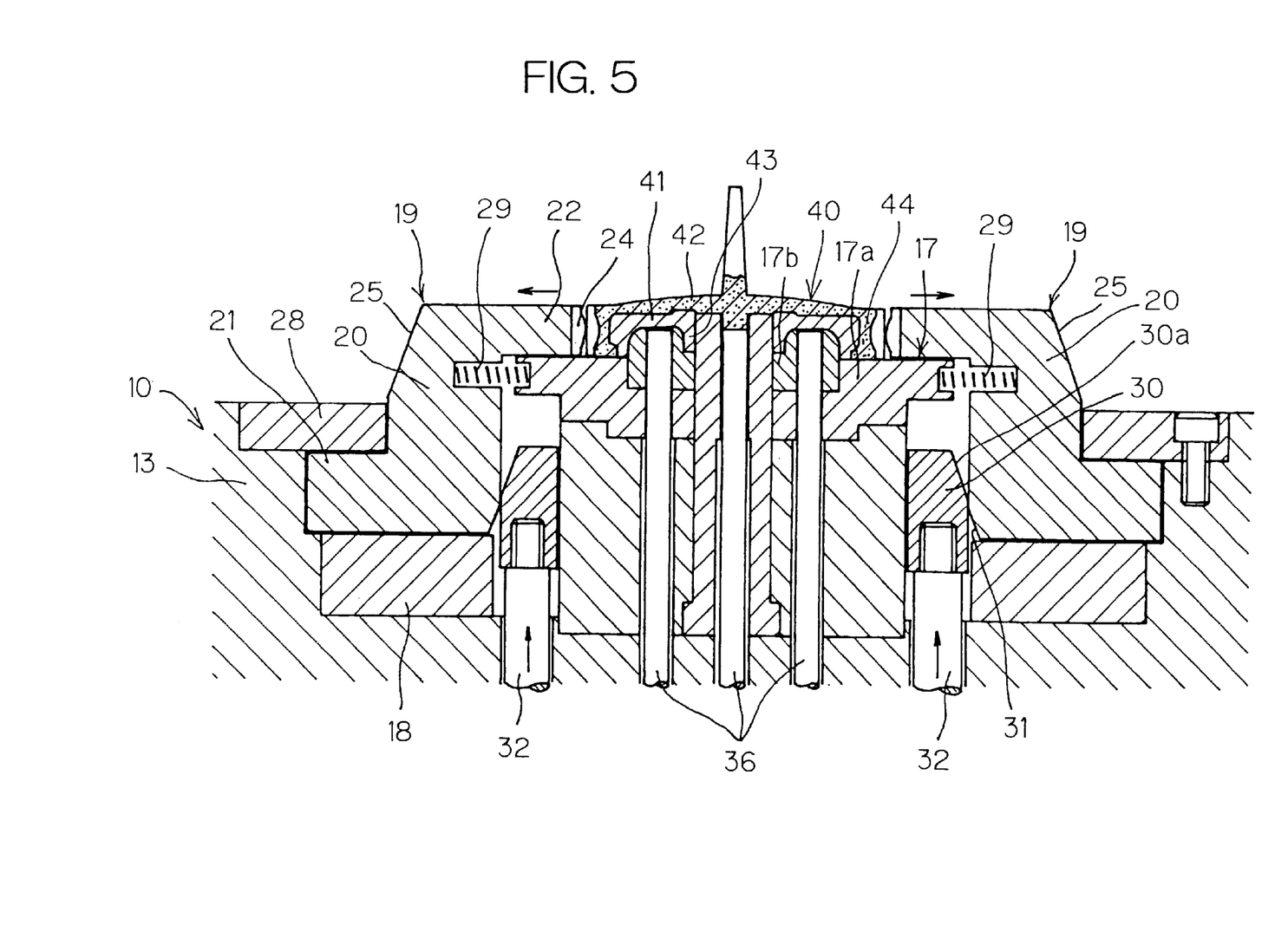
FIG. 5 is a sectional view showing the slide cores moved away from a worm wheel staying on the movable mold.
Figure 6:
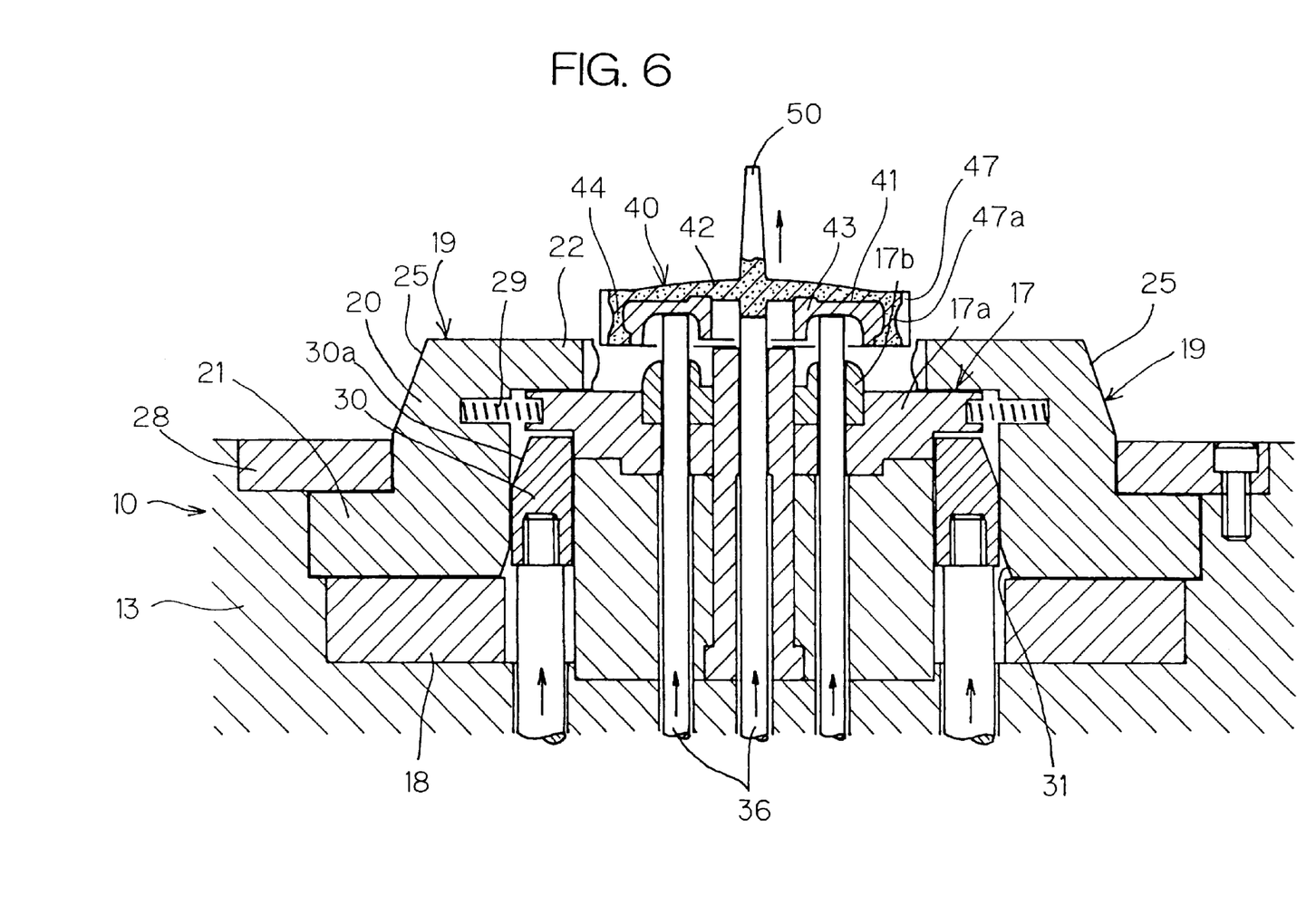
FIG. 6 is a sectional view showing the worm wheel being ejected from the mold.

Now referring to FIGS. 5 and 6, a worm wheel 40 according to the embodiment comprises a core 41, and a synthetic resin member 42 with the core 41 molded therein. The core 41 possesses a boss 43 in an inside diameter portion thereof, and an annular flange 44 at an outside diameter portion thereof.

Figure 8:
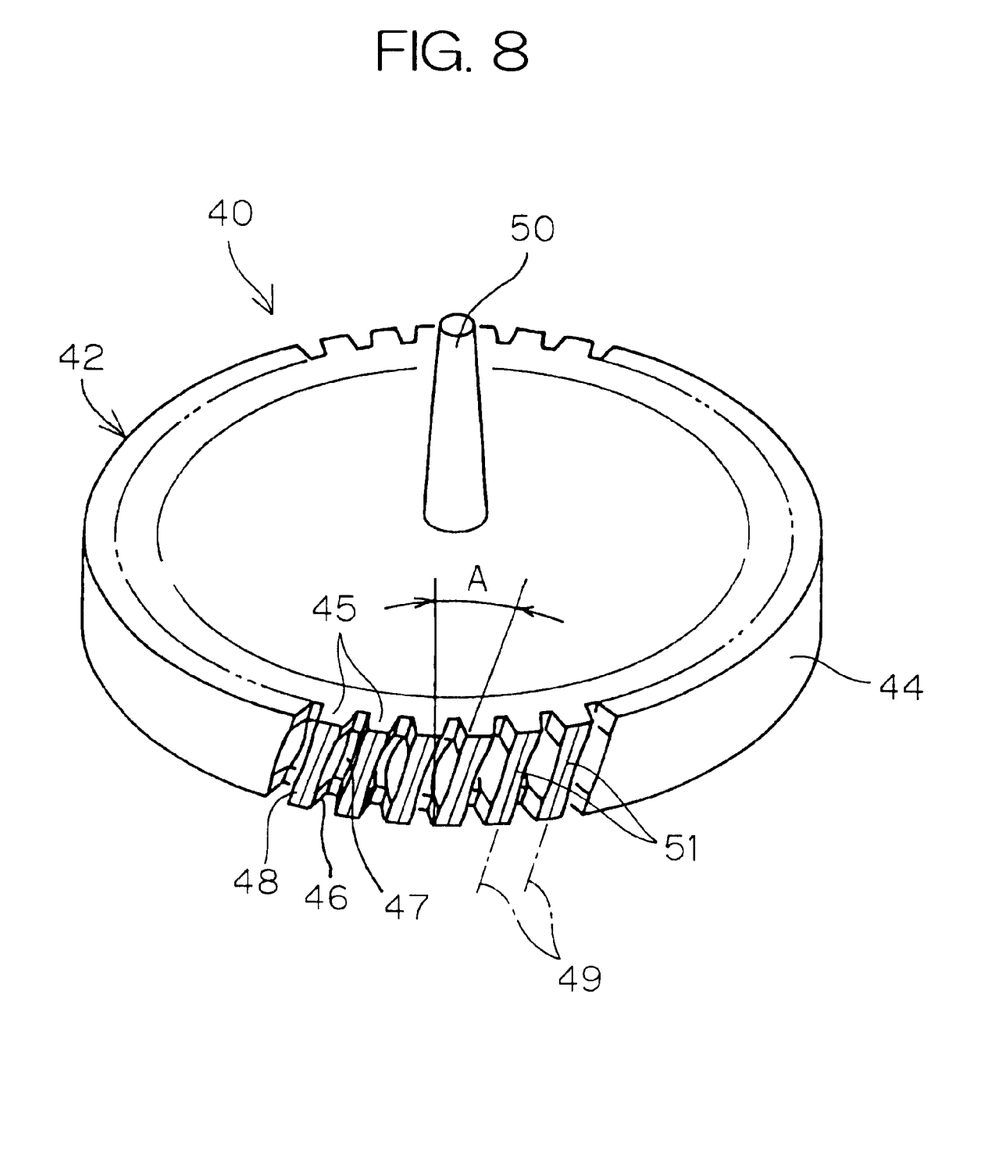
FIG. 8 is a schematic perspective view of the formed worm wheel.
Figure 9A:
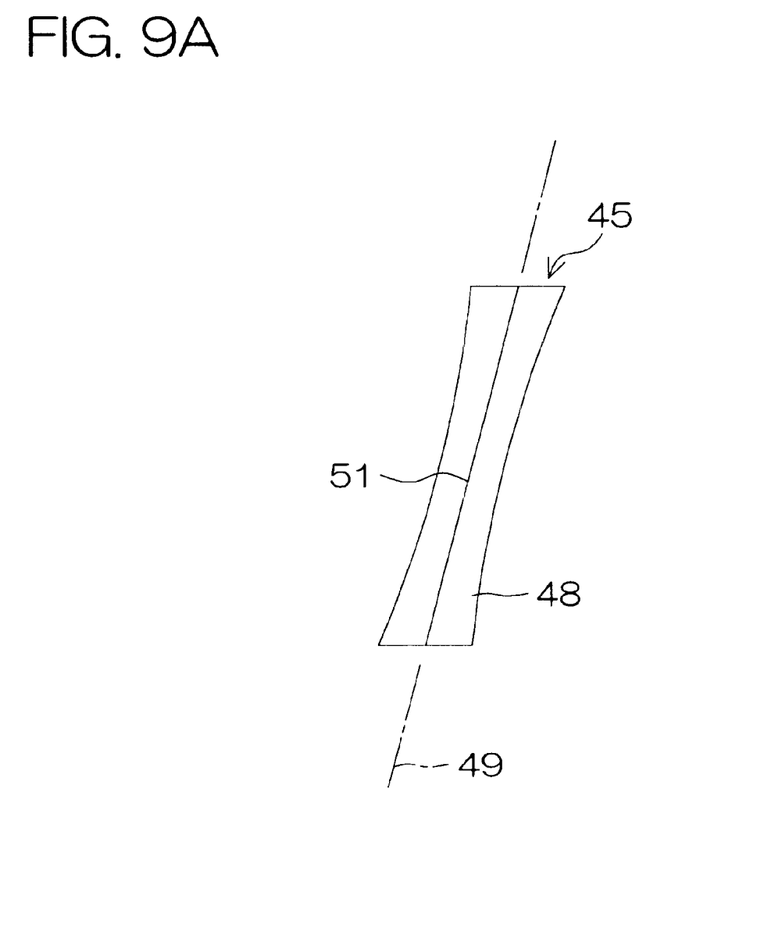
Figure 9B:
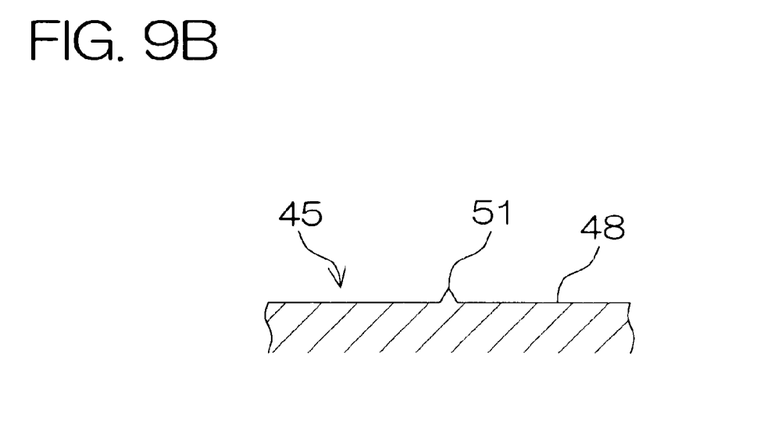
FIG. 9B is an enlarged schematic sectional view taken on the line 9B—9B in FIG. 9A.

As shown in FIG. 8, the synthetic resin member 42 defining an outer periphery of the worm wheel 40 is formed with a plurality of teeth 45 in its outer periphery, the tooth having a lead angle. As shown in FIG. 6, a bottom land 47 defining a bottom of a tooth space between the teeth 45, 45 includes a recessed surface 47a. Now referring to FIGS. 8 and 9A, there exists a trace 51 of a parting line 49 on a tooth crest 48 of each tooth 45, the trace 51 extending longitudinally of the tooth crest 48. Indicated at 50 is a projection formed in a sprue 5, which will be described hereinlater. The trace 51 may be exemplified by a projection of a chevron-shaped section as shown in FIG. 9A or a linearly extended step.

Figure 1:
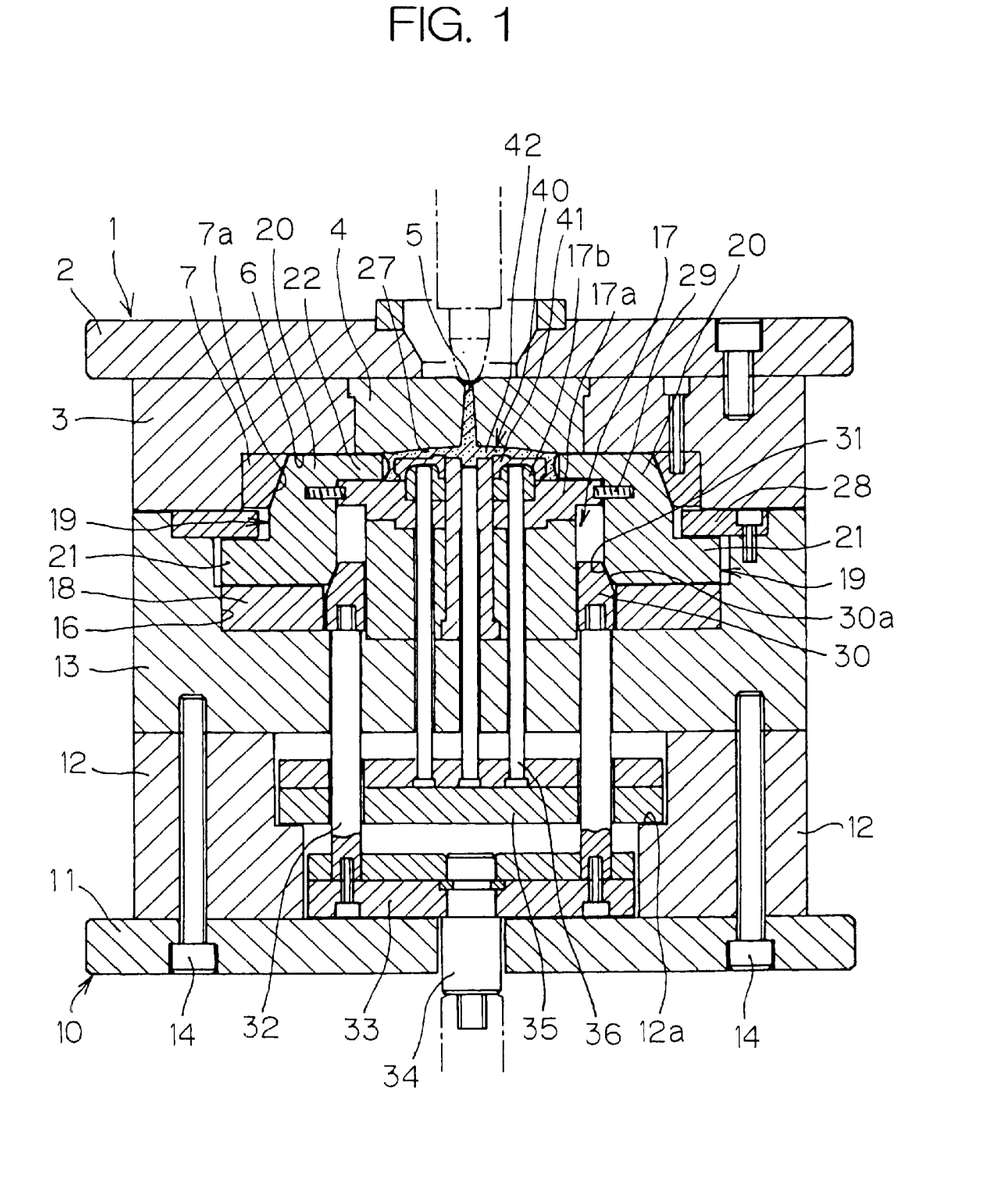
FIG. 1 is a vertically-sectioned front view of a forming machine according to the invention.
Figure 2:
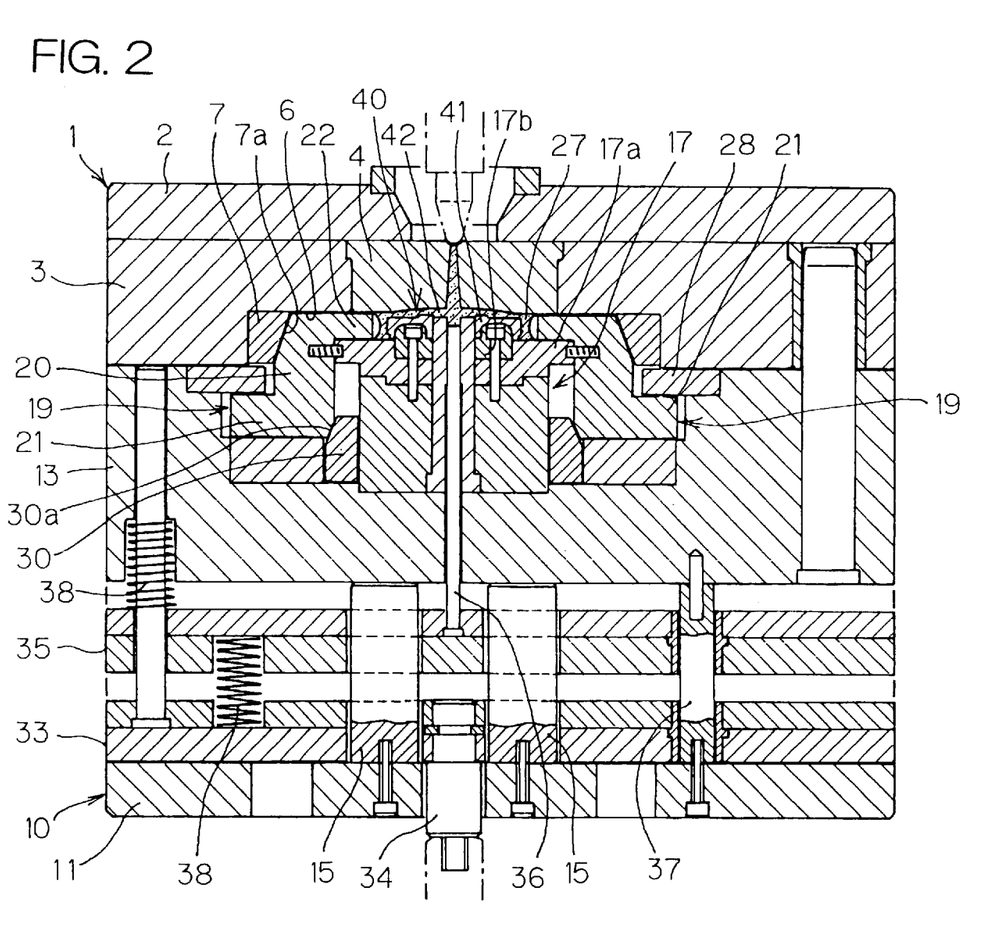
FIG. 2 is a vertically-sectioned side view of the machine of FIG. 1.
Figure 3:
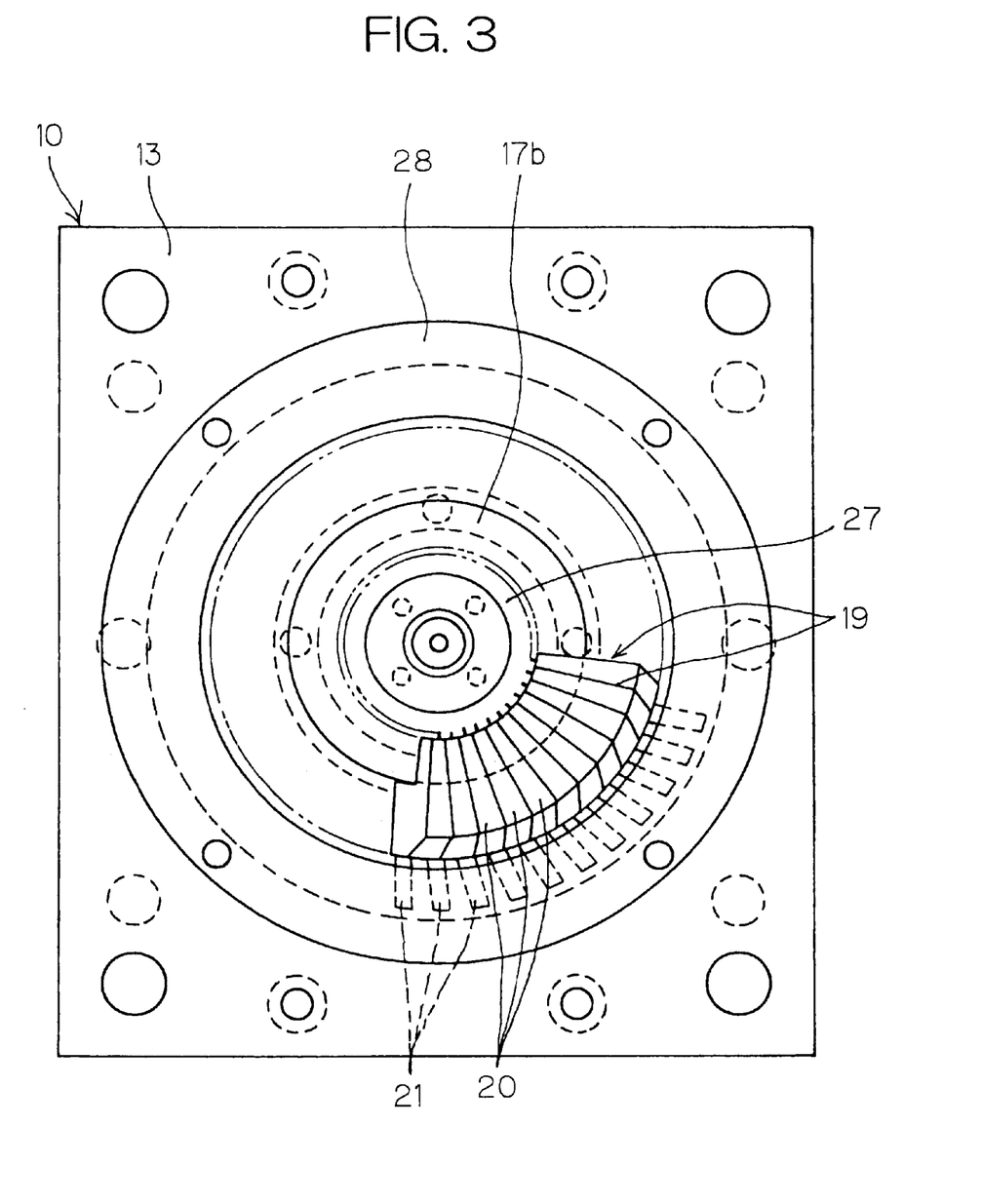
FIG. 3 is a plan view of a movable mold shown in FIG. 1.

As shown in FIGS. 1 and 2, a forming machine comprises a stationary mold 1 and a movable mold 10 adapted to move relative to the stationary mold 1. The stationary mold 1 possesses a stationary-side mounting plate 2, to which a stationary mold plate 3 is fixed.

A sprue bush 4 is fixed to place centrally of the stationary mold plate 3, whereas the sprue 5 is formed in the sprue bush 4. The stationary mold plate 3 is formed with a circular recess 6 in a bottom surface thereof, whereas a diameter decreasing taper ring 7 is fixed to place in the recess 6. The taper ring 7 has a tapered surface 7a defined by its inside surface.

The movable mold 10 possesses a movable-side mounting plate 11, which is provided with a pair of spacer blocks 12 at laterally opposite ends thereof, the spacer blocks 12 supporting a movable mold plate 13. The spacer blocks 12 and the movable mold plate 13 are combined together by tightening bolts 14. The movable mold plate 13 rests on a plurality of supporters 15 at a center of its bottom surface, the supporters 15 fixed to an upper surface of the movable-side mounting plate 11.

The movable mold plate 13 is formed with a circular recess 16 centrally of an upper surface thereof, whereas a core 17 is fixed to place centrally of a bottom surface of the recess 16. The core 17 is divided into an upper part and a lower part. An upper core 17a has a positioning core 17b seated thereon for retaining the core 41 of the worm wheel 40 in a positioned state as shown in FIG. 6.

When the movable mold 10 is closed, the core 17 defines a space between itself and a bottom surface of the sprue bush 4 of the stationary mold 1, the space corresponding to a face width of the worm wheel 40 shown in FIG. 8.

A guide plate 18 formed of an annular plate is disposed on the bottom surface of the recess 16 formed in the movable mold plate 13. A plurality of slide cores 19 rest on the guide plate 18 as arranged radially about the core 17.

Figure 4:
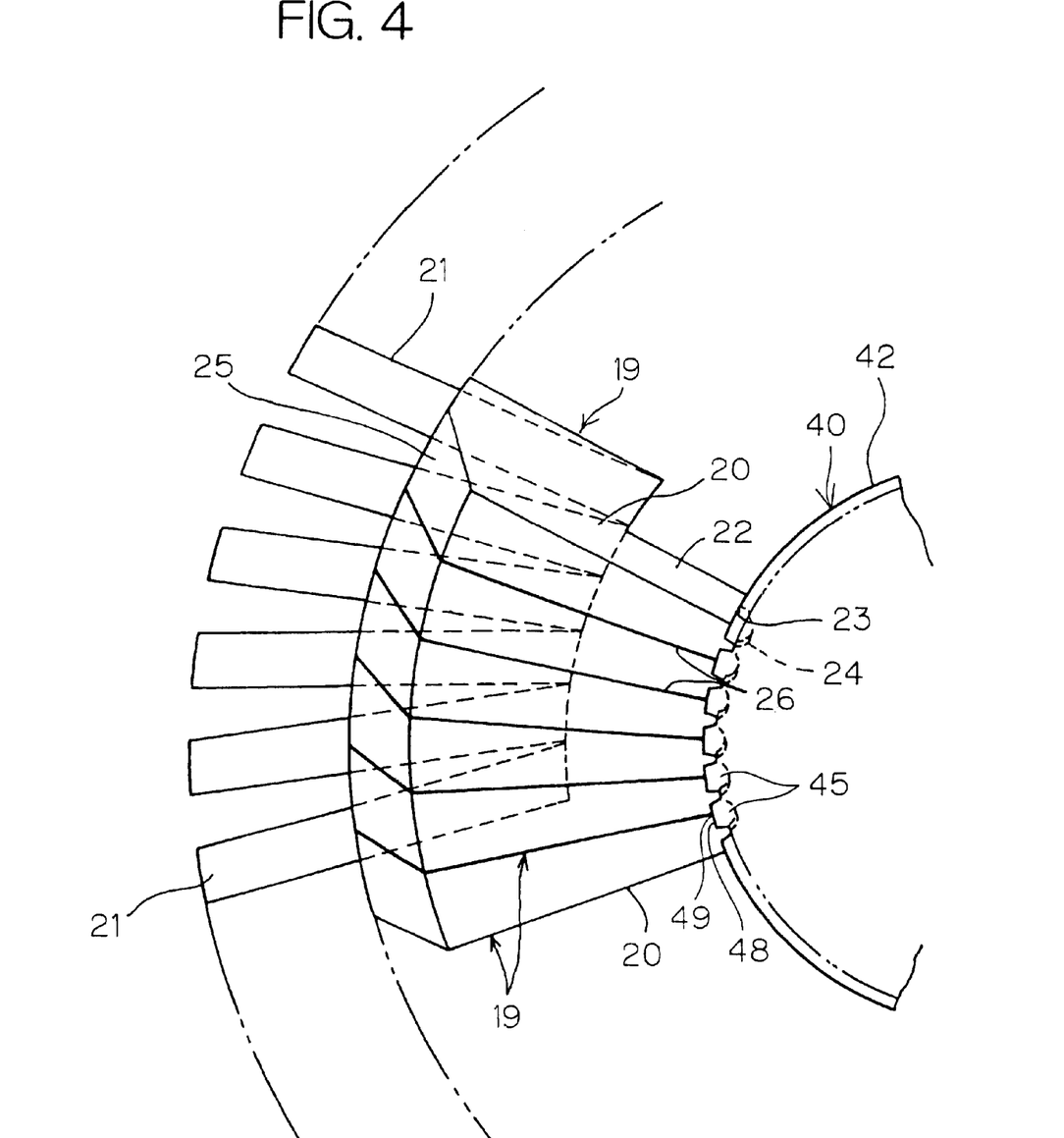
FIG. 4 is an enlarged plan view of slide cores shown in FIG. 3.
Figure 7A:
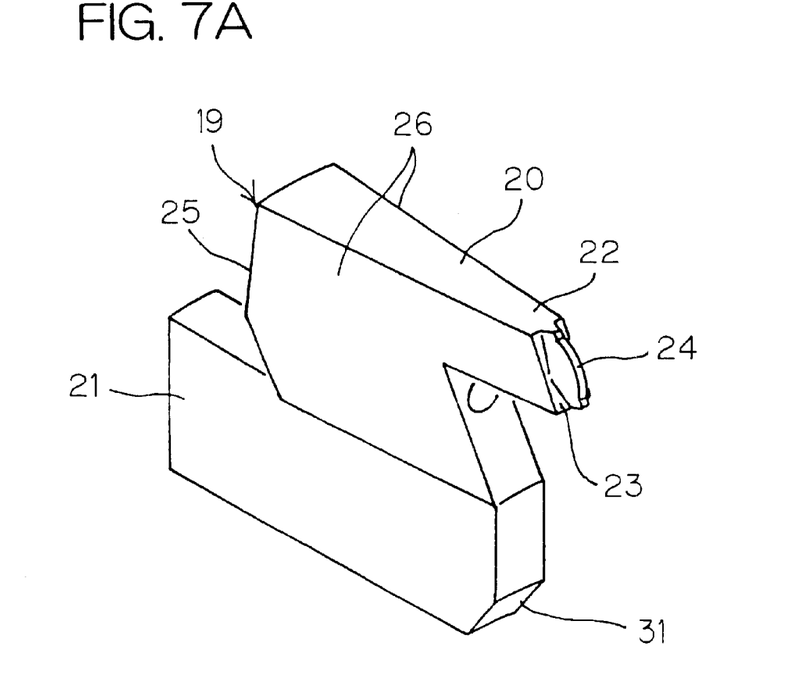
Figure 7B:
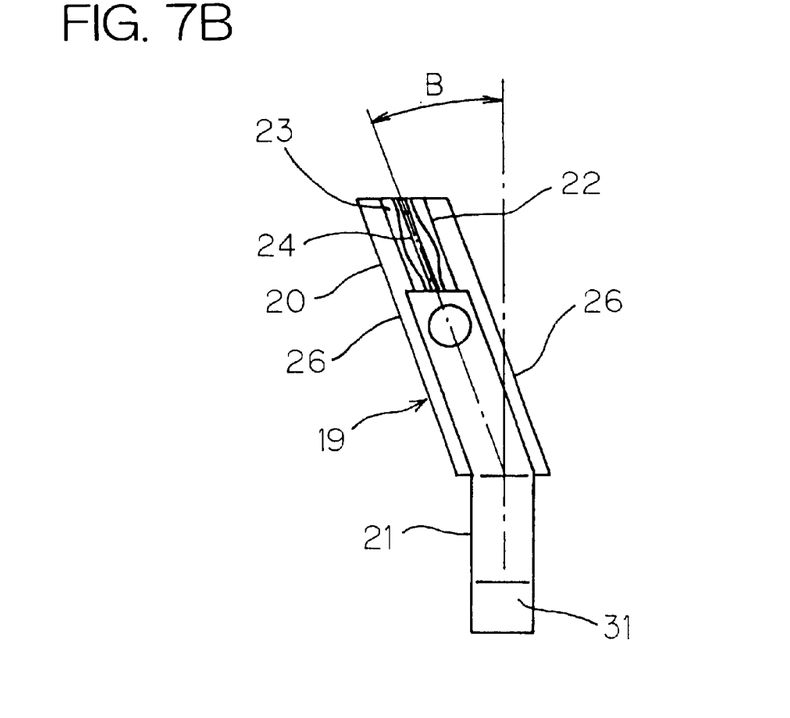
FIG. 7B is a front view of the slide core.

As shown in FIGS. 4 and 7, the slide core 19 includes a forming portion 20 at an upper part thereof and a guide portion 21 at a lower part thereof. The guide portion is formed in a uniform thickness along its length. The guide portion 21 is adapted to move radially of the recess 16 as carried on the guide plate 18.

It is noted that the guide plate 18 shown in FIG. 1 may be formed with a guide groove in its upper surface for slidably supporting the guided portions 21 of the slide cores 19.

The forming portion 20 includes a projection 22 at an inside upper part thereof, the projection resting on an upper surface of the upper core 17a. The projection 22 is formed with a tooth crest forming face 23 at its distal end, whereas a tooth-space forming projection 24 projects centrally of a width of the tooth crest forming face 23.

The forming portion 20 is inclined toward one lateral side relative to the guided portion 21 therebelow at an angle B which is equal to a lead angle A of the tooth 45 of the worm wheel 40 shown in FIG. 8.

The forming portion 20 has a fan-like shape in plan and is formed with a tapered surface 25 at a rear upper part thereof. The tapered surface 25 has a taper angle equal to that of the tapered surface 7a of the taper ring 7 mounted in the stationary mold plate 3.

When the movable mold 10 is closed, the slide core 19 contacts the tapered surface 7a of the taper ring 7 at the tapered surface 25 formed on its outside upper part, so as to be moved inwardly. The inward movement of the slide core brings its lateral sides 26 into intimate contact with those 26 of the adjoining slide cores 19 while a cavity 27 for forming the worm wheel 40 is formed between the bottom surface of the recess 6 of the stationary mold plate 3 and the upper surface of the upper core 17a, as shown in FIG. 1.

As seen in FIGS. 1 and 2, a slide holder 28 is fixed to an aperture of the recess 16 of the movable mold plate 13. The slide holder 28 has an annular shape and presents its inner periphery to the upper surface of the guide portion 21 of the slide core 19 thereby preventing the slide core 19 from disengaging from the recess 16.

The slide cores 19 are biased outwardly by means of a spring 29 disposed between itself and the upper core 17a.

A diameter increasing taper ring 30 is fitted about the core 17 fixed to the movable mold plate 13. The taper ring 30 is formed with a tapered surface 30a on its outer periphery, whereas the slide core 19 is formed with a tapered surface 31 at an inside lower part thereof in conformity with the tapered surface 30a.

The taper ring 30 is connected with upper ends of plural rods 32. Each rod 32 slidably extends through the movable mold plate 13 and has its lower end coupled to a push plate 33 interposed between the pair of spacer blocks 12. The push plate 33 is connected with a push-out jig 34, which is connected to a cylinder not shown. Thus, activating the cylinder causes the diameter increasing taper ring 30 to move up or down. When the taper ring 30 moves up, the tapered surface 30a thereof presses against the tapered surfaces 31 of the slide cores 19.

Disposed above the push plate 33 is an ejector plate 35, to which a plurality of ejector pins 36 are fixed at their lower ends. The ejector pins 36 slidably extend through the movable mold plate 13 and the core 17.

The ejector plate 35 assumes a lower position at which the ejector plate rests on a step 12a formed on an inner side of each spacer block 12. The ejector plate 35 is adapted to move up as pushed by the rising push plate 33.

Referring to FIG. 2, a guide pin 37 vertically movably supports the push plate 33 and the ejector plate 35. Indicated at 38 is a shock-absorbing spring for preventing the ejector plate 35 from impactively bumping against the steps 12a or the movable mold plate 13.

The forming machine according to the embodiment is constructed as described above. When the worm wheel 40 of FIG. 8 is formed, the core 41 of FIG. 6 is set on the positioning core 17b of the movable mold 10 and thereafter the movable mold 10 is closed.

When the movable mold 10 is closed, the outside tapered surfaces 25 of the plural slide cores 19 contact the tapered surface 7a of the diameter decreasing taper ring 7 disposed in the stationary mold 1, thereby being simultaneously moved inwardly. Thus, the slide cores bring their lateral sides 26 into intimate contact with those of the adjoining slide cores, as shown in FIG. 4. On the other hand, the inward movement of the slide cores 19 results in the formation of the cavity 27 between the sprue bush 4 of the stationary mold 1 and the core 17 of the movable mold 10.

Then, the worm wheel 40 shown in FIG. 8 may be formed by pressurizing a molten resin into the cavity 27 through the sprue 5 formed through the sprue bush 4.

In this process, the tooth crest forming face 23 of one slide core 19 cooperates with the tooth crest forming face 23 of the adjoining slide core 19 to form the tooth crest 48 of the tooth 45 of the worm wheel 40 shown in FIG. 8. This results in the formation of the parting line 49 of FIG. 1 along a joint between the tooth crest forming faces 23 of the adjoining slide cores 19. On the other hand, the tooth-space forming projection 24 forms the overall inside surface of a tooth space 46.

When the movable mold 10 is opened after the forming of the worm wheel 40, the formed worm wheel 40 remains on the movable mold 10.

When the push-out jig 34 is raised after the opening of the movable mold 10, the diameter increasing taper ring 30 is raised along with the push plate 33 so that the tapered surface 30a on the outer periphery of the tapering 30 presses against the tapered surfaces 31 at the inside lower parts of the slide cores 19. The pressure causes the plural slide cores 19 to move outwardly at a time, so that the projections 22 at the distal ends of the slide cores 19 are separated from the outer periphery of the worm wheel 40, as shown in FIG. 5. At this time, the slide cores 19 move diametrally outwardly of the worm wheel 40 so that the tooth-space forming projections 24 are smoothly moved away from the tooth spaces 46 of the worm wheel 40.

When further raised, the push plate 33 presses against the ejector plate 35 which, in turn, is raised by the pressure. Hence, the ejector pins 36 connected with the ejector plate 35 push up the worm wheel 40, thereby removing the worm wheel 40 from the movable mold 40, as shown in FIG. 6.

According to the embodiment of the invention, the trace 51 of the parting line 49 exists on the tooth crest 48 of the tooth 45 but not on the surface of action thereof and hence, the contact gear accuracies are increased.

Although the conventional method of hobbing the gear requires the machining allowance, the method of molding a resin material into the gear shape does not require such an allowance. Accordingly, the material cost is decreased. On the other hand, the cutting process must be followed by a deburring step. However, the method of the embodiment negates the need for the deburring step. This results in a notable reduction of manufacturing costs.

The hob machining process involves quite a cumbersome fabrication of a hob. According to the embodiment of the invention wherein the gear shape is obtained by molding, the mold can be readily fabricated by directly inputting three-dimensional CAD data on the gear shape into a machine such as a machining center. This not only results in an easy and less costly fabrication of the worm wheel 40 having high precisions, but also provides a greater freedom of configuring the gear shape.

Furthermore, the method of molding the worm wheel achieves an increased wear resistance of the worm wheel because a close-grained skin layer is formed on the surface of the formed teeth 45.

Particularly where the gear shape is formed by cutting an article formed from a resin material containing a reinforcing fiber, a fear exists that the reinforcing fiber may project from the tooth surface, decreasing the strength or fatigue strength of the worm wheel. According to the embodiment of the invention wherein the skin layer is formed as described above, the strength or fatigue strength of the worm wheel is increased. The embodiment of the invention further increases the strength or fatigue strength of the worm wheel because the reinforcing fiber is oriented along the surface of the teeth.

Although the embodiment of the invention has been described by way of example of the worm wheel 40 comprising the synthetic resin member 42 with the core 41 molded therein, the core 41 may be dispensed with. In this case, the positioning core 17b is not required whereas the upper surface of the upper core 17a has a shape in conformity with a shape of a side surface of the worm wheel 40 to be formed.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A machine for forming a worm wheel made by an injection molding process, said wheel comprising a tooth having a tooth crest, and a bottom land formed at a bottom of a tooth space between adjoining teeth, the bottom land including a recessed surface, at least the teeth being formed by injection molding a synthetic resin, the tooth crest including a trace formed along a parting line as a result of the injection molding process, the forming machine comprising:

a stationary mold;

a movable mold movably provided relative to the stationary mold;

a stationary mold plate disposed on the stationary mold;

a movable mold plate disposed on the movable mold;

recesses formed in opposite surfaces of the stationary mold plate and the movable mold plate;

a core disposed in the recess of the movable mold plate;

a plurality of slide cores allowed to move radially of the core as arranged radially about the core;

diameter decreasing means for simultaneously moving the slide cores radially inwardly relative to the core at closure of the movable mold; and diameter increasing means for simultaneously moving the slide cores radially outwardly relative to the core at opening of the movable mold, wherein each slide core includes a block shaped like a fan, wherein each block includes a tooth crest forming face and a tooth-space forming projection formed centrally of a width of the tooth crest forming face, and wherein, during the closure of the mold, adjoining slide cores are in intimate contact at a respective lateral side of their blocks while defining the parting line between their tooth crest forming faces.

2. The forming machine according to claim 1, wherein the diameter increasing means includes a taper ring slidably movable along an outer periphery of the core, the taper ring having a tapered surface formed on its outer periphery in conformity with a tapered surface formed at an inside end of the slide core.

3. The forming machine according to claim 1, wherein the diameter decreasing means includes a taper ring having a tapered surface formed in conformity with a tapered surface formed at an outside end of the slide core, the taper ring fixed in place in the recess of the stationary mold plate.

4. The forming machine according to claim 1, further comprising biasing means disposed on the outer periphery of the core for biasing the slide cores radially outwardly.

5. The forming machine according to claim 1, further comprising guide means disposed on the movable mold plate for guiding the slide cores to allow for radial sliding movement with respect to the core.

6. The forming machine according to claim 5, wherein each slide core further includes a guided portion continuous to the fan-shaped block and guided by the guide means.

* * * * *